(12) United States Patent
Gai et al.

(10) Patent No.: US 10,889,760 B2
(45) Date of Patent: Jan. 12, 2021

(54) BIOMASS GAS-CARBON CO-PRODUCTION REACTOR AND REACTION METHOD THEREOF

(71) Applicant: ZHEJIANG UNIVERSITY OF SCIENCE & TECHNOLOGY, Hangzhou (CN)

(72) Inventors: Xikun Gai, Zhejiang (CN); Wanpeng Liu, Zhejiang (CN); Yin Li, Zhejiang (CN); Jing Di, Zhejiang (CN); Lijuan Chen, Zhejiang (CN); Ruiqin Yang, Zhejiang (CN); Shengdao Shan, Zhejiang (CN)

(73) Assignee: Zhejiang University Of Science & Technology, Zhejiang (CN)

( * ) Notice: Subject to any disclaimer, the term of this patent is extended or adjusted under 35 U.S.C. 154(b) by 0 days.

(21) Appl. No.: 16/911,316

(22) Filed: Jun. 24, 2020

(65) Prior Publication Data

US 2020/0325399 A1  Oct. 15, 2020

(30) Foreign Application Priority Data

Oct. 30, 2019 (CN) .......................... 2019 1 1040637

(51) Int. Cl.
| | |
|---|---|
| C01B 31/10 | (2006.01) |
| C10B 49/18 | (2006.01) |
| C01B 32/39 | (2017.01) |
| C01B 32/336 | (2017.01) |
| B01D 45/14 | (2006.01) |

(Continued)

(52) U.S. Cl.
CPC .............. C10B 49/18 (2013.01); B01D 45/14 (2013.01); C01B 3/02 (2013.01); C01B 32/336 (2017.08); C01B 32/39 (2017.08); C10B 49/20 (2013.01); C10B 53/02 (2013.01); C10B 57/02 (2013.01);

(Continued)

(58) Field of Classification Search
CPC ........ C10B 49/18; C01B 32/39; C01B 32/336
See application file for complete search history.

(56) References Cited

U.S. PATENT DOCUMENTS 4,775,633 A * 10/1988 Rounbehler ......... G01N 21/766
422/238

FOREIGN PATENT DOCUMENTS

| CN | 106753491 A | 5/2017 |
|---|---|---|
| CN | 107099319 A | 8/2017 |

(Continued)

*Primary Examiner* — Stuart L Hendrickson

(57) ABSTRACT

A biomass gas-carbon co-production reactor includes: multiple downward bed pyrolysis zones, a gas-solid separation zone, an activated carbon activation zone, and a secondary pyrolysis reaction zone; wherein the activated carbon activation zone communicates with the gas-solid separation zone and the secondary pyrolysis reaction zone; tops of the downward bed pyrolysis zones penetrate through a top of the gas-solid separation zone, and a heat carrier inlet and a raw material inlet are symmetrically arranged on a left side and a right side of each of the downward bed pyrolysis zones; bottoms of the downward bed pyrolysis zones are located inside the secondary pyrolysis reaction zone for communicating; a fluidizing air inlet is provided at a bottom of the secondary pyrolysis reaction zone, and an activated gas inlet is provided at a top of the secondary pyrolysis reaction zone; an activated carbon outlet is provided on the gas-solid separation zone.

10 Claims, 2 Drawing Sheets

(51) Int. Cl.
    *C01B 3/02*     (2006.01)
    *C10B 49/20*     (2006.01)
    *C10B 53/02*     (2006.01)
    *C10B 57/02*     (2006.01)
    *C10J 3/84*     (2006.01)

(52) U.S. Cl.
    CPC ......... *C10J 3/84* (2013.01); *C10J 2300/0916* (2013.01)

(56) References Cited

FOREIGN PATENT DOCUMENTS

| | | |
|---|---|---|
| CN | 109628154 A | 4/2019 |
| WO | 2005/016819 A1 | 2/2005 |

\* cited by examiner

BIOMASS GAS-CARBON CO-PRODUCTION REACTOR AND REACTION METHOD THEREOF

CROSS REFERENCE OF RELATED APPLICATION

The present invention claims priority under 35 U.S.C. 9(a-d) to CN 201911040637.2, filed Oct. 30, 2019.

BACKGROUND OF THE PRESENT INVENTION

Field of Invention

The present invention relates to a technical field of biomass utilization, and more particularly to a biomass gas-carbon co-production reactor.

Description of Related Arts

Conventionally, biomass energy is a component of renewable energy. Straw, rice husks, fruit husks and the like are all biomass. The development and utilization of biomass energy provided a new idea for solving energy and ecological problems. Conventionally, biomass raw materials are mainly processed by direct combustion power generation and pyrolysis. However, biomass raw materials have low heat value, high moisture content, and high cost for large-scale raw material storage and transportation. Therefore, direct combustion power generation projects are relatively small-scaled due to raw material collection cost, leading to low efficiency. Furthermore, alkali metal contained in the straw will corrode the boiler with the flue gas, and will also cause SCR catalyst poisoning in the flue gas treatment system, thereby causing an excessive high cost for ultra-low emission of atmospheric pollutants in biomass power plants. Accordingly, biomass gas-carbon co-production technology has emerged. Compared with the direct combustion method, it is not only eco-friendly and efficient, but also produces usable resources such as biomass activated carbon, fuel gas, or steam, thus achieving multiple purposes and remarkable economic benefits.

However, although there have been a lot of researches on biomass pyrolysis and gasification to produce fuel gas or syngas as well as biomass activated carbon, most of them require combination of multiple equipment. Therefore, the present invention integrates equipment to achieve gas-carbon co-production, so as to produce fuel gas with high heat value and activated carbon with high quality. In particular, a gas-carbon co-production reactor and a reaction method thereof are provided for gas-carbon co-production in the integrated equipment, so as to produce fuel gas with high heat value and activated carbon with high quality.

SUMMARY OF THE PRESENT INVENTION

The present invention provides a biomass gas-carbon co-production reactor and a reaction method thereof, so as to achieve gas-carbon co-production in integrated equipment and produce fuel gas with high heat value as well as activated carbon with high quality.

Accordingly, in order to accomplish the above objects, the present invention provides: a biomass gas-carbon co-production reactor, comprising: multiple downward bed pyrolysis zones which are symmetrically arranged; and further comprising, from top to bottom: a gas-solid separation zone which is integrative formed, an activated carbon activation zone and a secondary pyrolysis reaction zone; wherein the activated carbon activation zone communicates with the gas-solid separation zone and the secondary pyrolysis reaction zone; tops of the downward bed pyrolysis zones penetrate through a top of the gas-solid separation zone, and a heat carrier inlet and a raw material inlet are symmetrically arranged on a left side and a right side of each of the downward bed pyrolysis zones; bottoms of the downward bed pyrolysis zones are located inside the secondary pyrolysis reaction zone for communicating therewith; a fluidizing air inlet is provided at a bottom of the secondary pyrolysis reaction zone, and an activated gas inlet is provided at a top of the secondary pyrolysis reaction zone; an activated carbon outlet is provided on the gas-solid separation zone, and a cyclone separator is provided in the gas-solid separation zone; a top of the cyclone separator penetrates through the top of the gas-solid separation zone, and a bottom of the cyclone separator is located inside the secondary pyrolysis reaction zone.

A heat carrier and biomass raw material particles are added into a downward bed pyrolysis zone through a heat carrier inlet and a raw material inlet, respectively; wherein the heat carrier and the biomass raw material particles gradually fall. The biomass raw material particles fully contact with the heat carrier during falling in the downward bed pyrolysis zone, in such a manner that a rapid pyrolysis reaction happens to generate high-temperature oil gas and a mixture of biomass pyrolysis semi-coke and the heat carrier. The high-temperature oil gas and the mixture of the biomass pyrolysis semi-coke and the heat carrier pass through a bottom of the downward bed pyrolysis zone, in such a manner that the high-temperature oil gas and the mixture fall into a bubbling bed pyrolysis zone of a secondary pyrolysis reaction zone; wherein the high-temperature oil gas in the bubbling bed pyrolysis zone generates fuel gas through secondary pyrolysis, and the mixture of the biomass pyrolysis semi-coke and the heat carrier are separated in the secondary pyrolysis reaction zone. Activated gas is transported into an air chamber through a fluidizing air inlet, and then the activated gas is transported into the bubbling bed pyrolysis zone to be mixed with the fuel gas generated. A mixed gas of the fuel gas and the activated gas gradually move from the secondary pyrolysis reaction zone to an activated carbon activation zone, and then from the activated carbon activation zone to a gas-solid separation zone. The mixed gas of the fuel gas and the activated gas is separated in the gas-solid separation zone by a cyclone separator to produce fine powder particles and medium heat value gas, wherein the medium heat value gas is discharged through a medium heat value gas outlet, and the fine powder particles gradually fall into the secondary pyrolysis reaction zone. The heat carrier separated is remained in the bubbling bed pyrolysis zone as a bubbling bed, and the biomass pyrolysis semi-coke moves from the secondary pyrolysis reaction zone to the activated carbon activation zone. The activated gas moves into the activated carbon activation zone through an activated gas inlet, to contact with and activate the biomass pyrolysis semi-coke moved into the activated carbon activation zone, thereby generating activated carbon. And the activated carbon generated is discharged from an activated carbon outlet. The activated carbon and the fuel gas can be produced in the save equipment, which makes biomass gas-carbon co-production more convenient and rapid.

Preferably, middle cross sections of the gas-solid separation zone, the activated carbon activation zone and the secondary pyrolysis reaction zone are all circular. A diameter of the middle cross section of the gas-solid separation zone is larger than that of the activated carbon activation zone, and the diameter of the middle cross section of the activated carbon activation zone is larger than that of the secondary pyrolysis reaction zone. A ratio of the middle cross sections is (1.4-3):1:(0.4-0.9). The diameters of the gas-solid separation zone, the activated carbon activation zone and the secondary pyrolysis reaction zone are gradually reduced, so that the high-temperature oil gas and the mixture of the biomass pyrolysis semi-coke and the heat carrier in the secondary pyrolysis reaction zone can further contact with the bubbling bed pyrolysis zone to facilitate generation of the activated carbon and the fuel gas. At the same time, gas flow rate in different zones is varied by changing the diameters and gas compositions therein. Then density difference of the heat carrier and the pyrolysis activated carbon is used to achieve distribution and separation of materials in each zone.

Preferably, an air distribution plate is fixed in the secondary pyrolysis reaction zone, and divides the secondary pyrolysis reaction zone into an upper portion having a bubbling bed pyrolysis zone and a lower portion having an air chamber; the fluidizing air inlet communicates with the air chamber; the activated gas inlet communicates with a top of the bubbling bed pyrolysis zone; the bottoms of the downward bed pyrolysis zones are located above the air distribution plate. Cross sections of the downward bed pyrolysis zones are rectangular, square, or circular. The activated gas flows into the air chamber through the fluidizing air inlet. The activated gas in the air chamber evenly flows into the bubbling bed pyrolysis zone through the air distribution plate, to fully contact with the high-temperature oil gas and the mixture of the biomass pyrolysis semi-coke and the heat carrier in the bubbling bed pyrolysis zone, so that the secondary pyrolysis reaction between the high-temperature oil gas and the activated gas is more complete.

Preferably, multiple guide plates are fixed inside the secondary pyrolysis reaction zone, which correspond to the downward bed pyrolysis zones; cross-sectional areas of bottoms of the guide plates are greater than cross-sectional areas of the downward bed pyrolysis zones; the guide plates are located right below the downward bed pyrolysis zones. Tops of the guide plates are narrow and bottoms are wide. The high-temperature oil gas and the mixture of the biomass pyrolysis semi-coke and the heat carrier from the downward bed pyrolysis zones first contact with the tops of the guide plates, and then fall into the bubbling bed pyrolysis zone through the bottoms of the guide plates. The guide plates can prevent the fluidizing air from affecting material outflow of the downward bed pyrolysis zone, so that the high-temperature oil gas and the mixture of the biomass pyrolysis semi-coke and the heat carrier in the bubbling bed pyrolysis zone is distributed more uniformly.

Preferably, a folding plate, which is in a conical frustum form, is integrally provided at the bottom of each downward bed pyrolysis zone. A diameter of a bottom of the folding plate is smaller than a diameter of a top, and the guide plate is located right below the bottom of the folding plate. The high-temperature oil gas and the mixture of the biomass pyrolysis semi-coke and the heat carrier the bottoms of the downward bed pyrolysis zones first pass through the top of the folding plate, and then gradually accumulate within the folding plate before flowing out from the bottom of the folding plate. As a result, the high temperature oil gas and the mixture of the biomass pyrolysis semi-coke and the heat carrier will not directly fall into the bubbling bed pyrolysis zone, which avoids uneven distribution of the high temperature oil gas and the mixture of the biomass pyrolysis semi-coke and the heat carrier in the bubbling bed pyrolysis zone.

Preferably, the top of the cyclone separator is integrally provided with a medium heat value gas outlet, and the medium heat value gas outlet penetrates through the top of the gas-solid separation zone for the benefit of medium heat value gas discharge.

Preferably, the activated carbon outlet is inclined; an angle between a top of the activated carbon outlet and a side wall of a second shell is smaller than an angle between a bottom of the activated carbon outlet and the side wall of the second shell, which is conducive to collecting the activated carbon.

A reaction method of biomass gas-carbon co-production is also provided, comprising steps of:

S1: adding a heat carrier and biomass raw material particles into a downward bed pyrolysis zone 4 through a heat carrier inlet 5 and a raw material inlet 6, respectively; wherein the heat carrier and the biomass raw material particles gradually fall;

S2: fully contacting the biomass raw material particles with the heat carrier during falling in the downward bed pyrolysis zone 4, in such a manner that a rapid pyrolysis reaction happens to generate high-temperature oil gas and a mixture of biomass pyrolysis semi-coke and the heat carrier;

S3: passing the high-temperature oil gas and the mixture of the biomass pyrolysis semi-coke and the heat carrier through a bottom of the downward bed pyrolysis zone 4, in such a manner that the high-temperature oil gas and the mixture fall into a bubbling bed pyrolysis zone 12 of a secondary pyrolysis reaction zone 3; wherein the high-temperature oil gas in the bubbling bed pyrolysis zone 12 generates fuel gas through secondary pyrolysis, and the mixture of the biomass pyrolysis semi-coke and the heat carrier are separated in the secondary pyrolysis reaction zone 3;

S4: transporting activated gas into an air chamber 13 through a fluidizing air inlet 7, and then transporting the activated gas into the bubbling bed pyrolysis zone 12 to be mixed with the fuel gas generated in the step S3;

S5: gradually moving a mixed gas of the fuel gas and the activated gas from the secondary pyrolysis reaction zone 3 to an activated carbon activation zone 2, and then from the activated carbon activation zone 2 to a gas-solid separation zone 1;

S6: separating the mixed gas of the fuel gas and the activated gas in the gas-solid separation zone 1 by a cyclone separator 10 to produce fine powder particles and medium heat value gas, wherein the medium heat value gas is discharged through a medium heat value gas outlet 16, and the fine powder particles gradually fall into the secondary pyrolysis reaction zone 3;

S7: remaining the heat carrier separated in the step S3 in the bubbling bed pyrolysis zone 12 as a bubbling bed, and moving the biomass pyrolysis semi-coke from the secondary pyrolysis reaction zone 3 to the activated carbon activation zone 2;

S8: moving the activated gas into the activated carbon activation zone 2 through an activated gas inlet 8, to contact with and activate the biomass pyrolysis semi-coke moved into the activated carbon activation zone 2 in the step S7, thereby generating activated carbon; and S9: discharging the activated carbon generated in the step S8 from an activated carbon outlet 9.

Preferably, in the step S4, the activated gas transported into the air chamber through the fluidizing air inlet is high-temperature water vapor, which is convenient for the secondary pyrolysis reaction of the high-temperature oil gas; in the step S8, the activated gas moved into the activated carbon activation zone through the activated gas inlet is water vapor and carbon dioxide, in such a manner that the biomass pyrolysis semi-coke is fully and comprehensively activated.

Preferably, a slag discharge port, which is circular, is provided at a center of a circle at a bottom of the secondary pyrolysis reaction zone, so as to better discharge the solid separated by the cyclone separator.

With the above technical solution, beneficial effects of the present invention are as follows.

1. By combining the downward bed pyrolysis zones, bubbling bed secondary pyrolysis and fluidizing bed activation in the same equipment, pyrolysis and activation conditions can be flexibly adjusted to ensure completion of the pyrolysis and activation reactions. That is to say, the high-performance activated carbon and the medium heat value fuel gas can be co-produced as well as separated, making the biomass gas-carbon co-production more convenient and rapid.

2. In the integrated equipment, pyrolysis is carried out in the downward bed pyrolysis zones and the bubbling bed pyrolysis zone with the heat carrier as a heat source. Activation is carried out in the downward bed pyrolysis zones with the fluidizing are as the activated gas. No air is involved in the whole process, which can ensure completion of the pyrolysis and activation reactions, thus ensuring qualities of the obtained fuel gas and the activated carbon.

BRIEF DESCRIPTION OF THE DRAWINGS

In order to explain embodiments of the present invention or technical solutions in the prior art more clearly, drawings involved in the embodiments or the prior art will be briefly described below. Obviously, the drawings described below are only for the embodiments of the present invention. For those of ordinary skill in the art, other drawings can be obtained based on these drawings without any creative work.

Element reference: 1—gas-solid separation zone; 2—activated carbon activation zone; 3—second pyrolysis reaction zone; 4—downward bed pyrolysis zone; 5—heat carrier inlet; 6—raw material inlet; 7—fluidizing air inlet; 8—activated gas inlet; 9—activated carbon outlet; 10—cyclone separator; 11—air distribution plate; 12—bubbling bed pyrolysis zone; 13—air chamber; 14—guide plate; 15—folding plate; 16—middle heat value gas outlet; 17—slag discharge port.

DETAILED DESCRIPTION OF THE PREFERRED EMBODIMENT

Technical solutions in the embodiments of the present invention will be described clearly and completely in conjunction with the accompanying drawings. Obviously, the described embodiments are only a part of all embodiments of the present invention. Based on the described embodiments, all other embodiments obtained by those of ordinary skill in the art without creative work must fall within the protection scope of the present invention.

Figure 1:
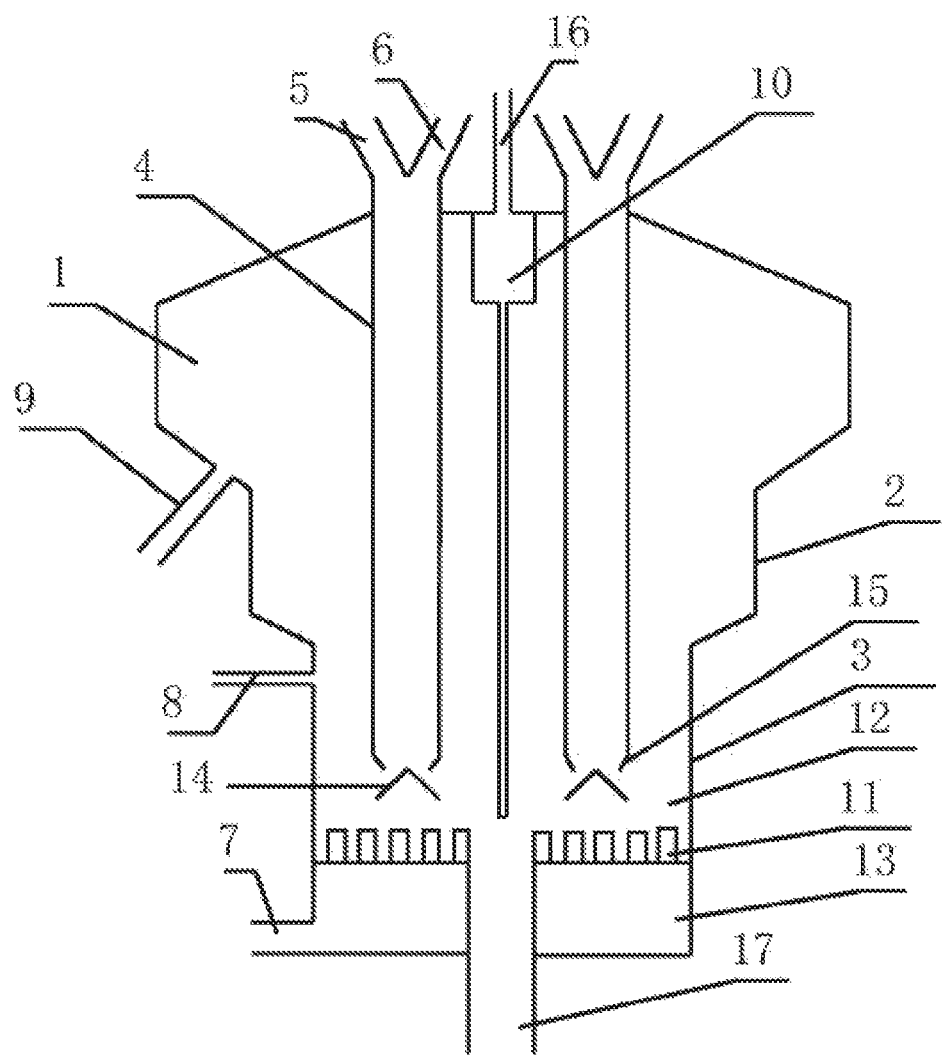
FIG. 1 is a structural view of the present invention.
Figure 2:
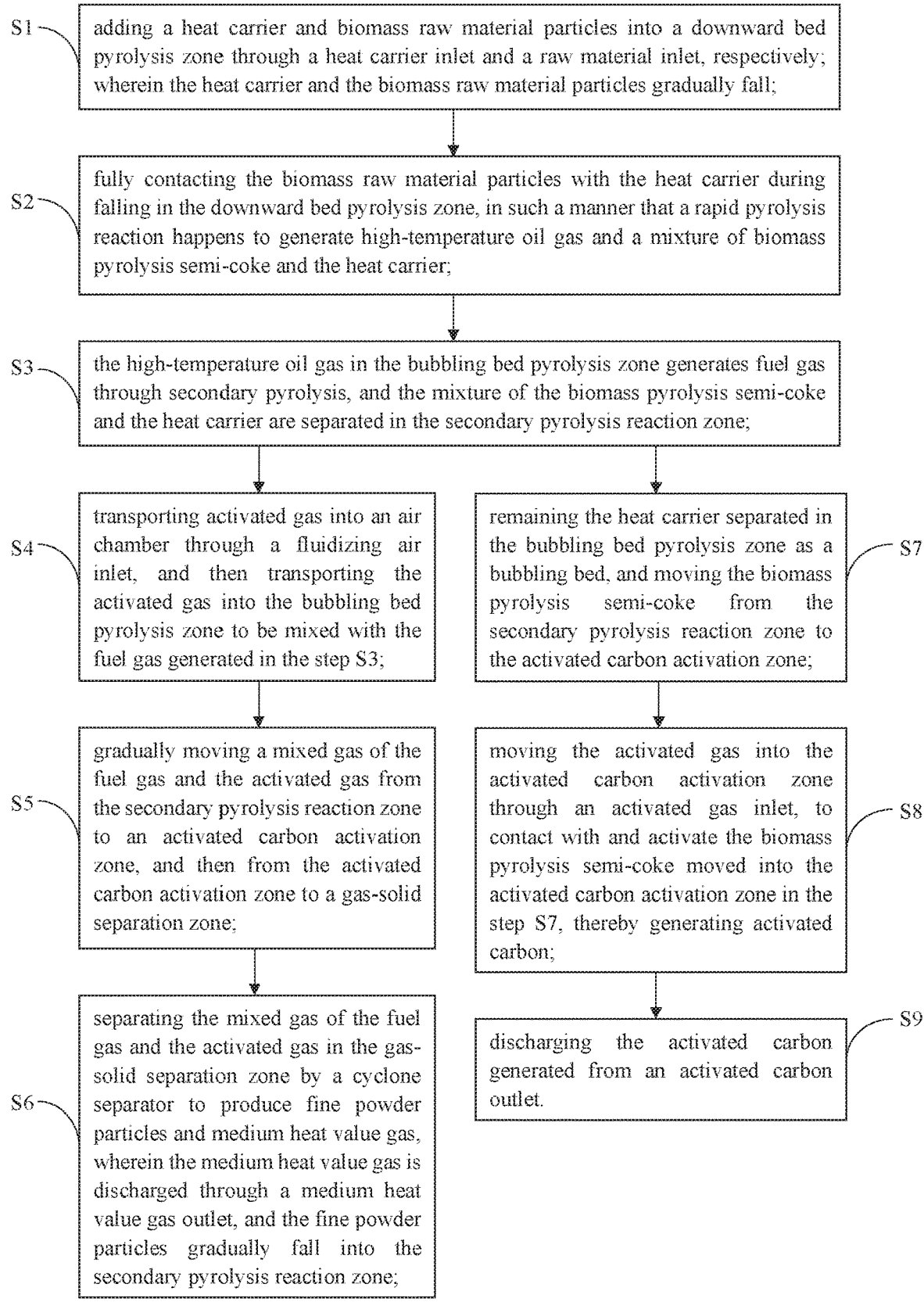
FIG. 2 is a flow chart of the present invention.

Referring to FIGS. 1 and 2, a biomass gas-carbon co-production reactor is illustrated, comprising: multiple downward bed pyrolysis zones 4 which are symmetrically arranged; and further comprising, from top to bottom: a gas-solid separation zone 1 which is integrative formed, an activated carbon activation zone 2 and a secondary pyrolysis reaction zone 3; wherein the activated carbon activation zone 2 communicates with the gas-solid separation zone 1 and the secondary pyrolysis reaction zone 3; the multiple downward bed pyrolysis zones 4 are provided in the gas-solid separation zone 1; tops of the downward bed pyrolysis zones 4 penetrate through a top of the gas-solid separation zone 1, and a heat carrier inlet 5 and a raw material inlet 6 are symmetrically arranged on a left side and a right side of each of the downward bed pyrolysis zones 4; bottoms of the downward bed pyrolysis zones 4 are located inside the secondary pyrolysis reaction zone 3 for communicating therewith; a fluidizing air inlet 7 is provided at a bottom of the secondary pyrolysis reaction zone 3, and an activated gas inlet 8 is provided at a top of the secondary pyrolysis reaction zone 3; an activated carbon outlet 9 is provided on the gas-solid separation zone 1, and a cyclone separator 10 is provided in the gas-solid separation zone 1; a top of the cyclone separator 10 penetrates through the top of the gas-solid separation zone 1, and a bottom of the cyclone separator 10 is located inside the secondary pyrolysis reaction zone 3; wherein the cyclone separator 10 can be replaced by a filter.

A heat carrier and biomass raw material particles are added into a downward bed pyrolysis zone 4 through a heat carrier inlet 5 and a raw material inlet 6, respectively; wherein the heat carrier and the biomass raw material particles gradually fall. The biomass raw material particles fully contact with the heat carrier during falling in the downward bed pyrolysis zone 4, in such a manner that a rapid pyrolysis reaction happens to generate high-temperature oil gas and a mixture of biomass pyrolysis semi-coke and the heat carrier. The high-temperature oil gas and the mixture of the biomass pyrolysis semi-coke and the heat carrier pass through a bottom of the downward bed pyrolysis zone 4, in such a manner that the high-temperature oil gas and the mixture fall into a bubbling bed pyrolysis zone 12 of a secondary pyrolysis reaction zone 3; wherein the high-temperature oil gas in the bubbling bed pyrolysis zone 12 generates fuel gas through secondary pyrolysis, and the mixture of the biomass pyrolysis semi-coke and the heat carrier are separated in the secondary pyrolysis reaction zone 3. Activated gas is transported into an air chamber 13 through a fluidizing air inlet 7, and then the activated gas is transported into the bubbling bed pyrolysis zone 12 to be mixed with the fuel gas generated. A mixed gas of the fuel gas and the activated gas gradually move from the secondary pyrolysis reaction zone 3 to an activated carbon activation zone 2, and then from the activated carbon activation zone 2 to a gas-solid separation zone 1. The mixed gas of the fuel gas and the activated gas is separated in the gas-solid separation zone 1 by a cyclone separator 10 to produce fine powder particles and medium heat value gas, wherein the medium heat value gas is discharged through a medium heat value gas outlet 16, and the fine powder particles gradually fall into the secondary pyrolysis reaction zone 3. The heat carrier separated is remained in the bubbling bed pyrolysis zone 12 as a bubbling bed, and the biomass pyrolysis semi-coke moves from the secondary pyrolysis reaction zone 3 to the activated carbon activation zone 2. The activated gas moves into the activated carbon activation zone 2 through an activated gas inlet 8, to contact with and activate the biomass pyrolysis semi-coke moved into the activated carbon activation zone 2, thereby generating activated carbon. And the activated carbon generated is discharged from an activated carbon outlet 9. The activated carbon and the fuel gas can be produced in the save equipment, which makes biomass gas-carbon co-production more convenient and rapid.

Middle cross sections of the gas-solid separation zone 1, the activated carbon activation zone 2 and the secondary pyrolysis reaction zone 3 are all circular. A diameter of the middle cross section of the gas-solid separation zone 1 is larger than that of the activated carbon activation zone 2, and the diameter of the middle cross section of the activated carbon activation zone 2 is larger than that of the secondary pyrolysis reaction zone 3. The diameters of the gas-solid separation zone 1, the activated carbon activation zone 2 and the secondary pyrolysis reaction zone 3 are gradually reduced. A ratio of the middle cross sections is (1.4-3):1:(0.4-0.9), so that the high-temperature oil gas and the mixture of the biomass pyrolysis semi-coke and the heat carrier in the secondary pyrolysis reaction zone 3 can further contact with the bubbling bed pyrolysis zone 12 to facilitate generation of the activated carbon and the fuel gas. At the same time, gas flow rate in different zones is varied by changing the diameters and gas compositions therein. Then density difference of the heat carrier and the pyrolysis activated carbon is used to achieve distribution and separation of materials in each zone.

An air distribution plate 11 is fixed in the secondary pyrolysis reaction zone 3, and divides the secondary pyrolysis reaction zone 3 into an upper portion having a bubbling bed pyrolysis zone 12 and a lower portion having an air chamber 13; the fluidizing air inlet 7 communicates with the air chamber 13; the activated gas inlet 8 communicates with a top of the bubbling bed pyrolysis zone 12; the bottoms of the downward bed pyrolysis zones 4 are located above the air distribution plate 11. Cross sections of the downward bed pyrolysis zones 4 are rectangular, square, or circular. The activated gas flows into the air chamber 13 through the fluidizing air inlet 7. The activated gas in the air chamber 13 evenly flows into the bubbling bed pyrolysis zone 12 through the air distribution plate 11, to fully contact with the high-temperature oil gas and the mixture of the biomass pyrolysis semi-coke and the heat carrier in the bubbling bed pyrolysis zone 12, so that the secondary pyrolysis reaction between the high-temperature oil gas and the activated gas is more complete.

Multiple guide plates 14 are fixed inside the secondary pyrolysis reaction zone 3, which correspond to the downward bed pyrolysis zones 4. Tops of the guide plates 14 are narrow and bottoms are wide. The guide plates 14 are located right below the downward bed pyrolysis zones 4. Cross-sectional areas of bottoms of the guide plates 14 are greater than cross-sectional areas of the downward bed pyrolysis zones 4. The high-temperature oil gas and the mixture of the biomass pyrolysis semi-coke and the heat carrier from the downward bed pyrolysis zones 4 first contact with the tops of the guide plates 14, and then fall into the bubbling bed pyrolysis zone 12 through the bottoms of the guide plates 14. The guide plates 14 can prevent the fluidizing air from affecting material outflow of the downward bed pyrolysis zone 4, so that the high-temperature oil gas and the mixture of the biomass pyrolysis semi-coke and the heat carrier in the bubbling bed pyrolysis zone 12 is distributed more uniformly.

A folding plate 15, which is in a conical frustum form, is integrally provided at the bottom of each downward bed pyrolysis zone 4. A diameter of a bottom of the folding plate 15 is smaller than a diameter of a top, and the guide plate 14 is located right below the bottom of the folding plate 15. The high-temperature oil gas and the mixture of the biomass pyrolysis semi-coke and the heat carrier the bottoms of the downward bed pyrolysis zones 4 first pass through the top of the folding plate 15, and then gradually accumulate within the folding plate 15 before flowing out from the bottom of the folding plate 15. As a result, the high temperature oil gas and the mixture of the biomass pyrolysis semi-coke and the heat carrier will not directly fall into the bubbling bed pyrolysis zone 12, which avoids uneven distribution of the high temperature oil gas and the mixture of the biomass pyrolysis semi-coke and the heat carrier in the bubbling bed pyrolysis zone 12.

The top of the cyclone separator 10 is integrally provided with a medium heat value gas outlet 16, and the medium heat value gas outlet 16 penetrates through the top of the gas-solid separation zone 1 for the benefit of medium heat value gas discharge.

The activated carbon outlet 9 is inclined; an angle between a top of the activated carbon outlet 9 and a side wall of a second shell is smaller than an angle between a bottom of the activated carbon outlet 9 and the side wall of the second shell, which is conducive to collecting the activated carbon.

A reaction method of biomass gas-carbon co-production is also provided, comprising steps of:

S1: adding a heat carrier and biomass raw material particles into a downward bed pyrolysis zone through a heat carrier inlet and a raw material inlet, respectively; wherein the heat carrier and the biomass raw material particles gradually fall;

S2: fully contacting the biomass raw material particles with the heat carrier during falling in the downward bed pyrolysis zone, in such a manner that a rapid pyrolysis reaction happens to generate high-temperature oil gas and a mixture of biomass pyrolysis semi-coke and the heat carrier;

S3: passing the high-temperature oil gas and the mixture of the biomass pyrolysis semi-coke and the heat carrier through a bottom of the downward bed pyrolysis zone, in such a manner that the high-temperature oil gas and the mixture fall into a bubbling bed pyrolysis zone of a secondary pyrolysis reaction zone; wherein the high-temperature oil gas in the bubbling bed pyrolysis zone generates fuel gas through secondary pyrolysis, and the mixture of the biomass pyrolysis semi-coke and the heat carrier are separated in the secondary pyrolysis reaction zone;

S4: transporting activated gas into an air chamber through a fluidizing air inlet, and then transporting the activated gas into the bubbling bed pyrolysis zone to be mixed with the fuel gas generated in the step S3;

S5: gradually moving a mixed gas of the fuel gas and the activated gas from the secondary pyrolysis reaction zone to an activated carbon activation zone, and then from the activated carbon activation zone to a gas-solid separation zone;

S6: separating the mixed gas of the fuel gas and the activated gas in the gas-solid separation zone by a cyclone separator to produce tine powder particles and medium heat value gas, wherein the medium heat value gas is discharged through a medium heat value gas outlet, and the fine powder particles gradually fall into the secondary pyrolysis reaction zone;

S7: remaining the heat carrier separated in the step S3 in the bubbling bed pyrolysis zone as a bubbling bed, and moving the biomass pyrolysis semi-coke from the secondary pyrolysis reaction zone to the activated carbon activation zone;

S8: moving the activated gas into the activated carbon activation zone through an activated gas inlet, to contact with and activate the biomass pyrolysis semi-coke moved into the activated carbon activation zone in the step S7, thereby generating activated carbon; and S9: discharging the activated carbon generated in the step S8 from an activated carbon outlet.

In the step S4, the activated gas transported into the air chamber 13 through the fluidizing air inlet 7 is high-temperature water vapor, which is convenient for the secondary pyrolysis reaction of the high-temperature oil gas; in the step S8, the activated gas moved into the activated carbon activation zone 2 through the activated gas inlet 8 is water vapor and carbon dioxide, in such a manner that the biomass pyrolysis semi-coke is fully and comprehensively activated.

A slag discharge port 17, which is circular, is provided at a center of a circle at a bottom of the secondary pyrolysis reaction zone 3, so as to better discharge the solid separated by the cyclone separator 10.

In the description of the present invention, it should be understood that the terms "longitudinal", "lateral", "upper", "lower", "front", "back", "left", "right", "vertical", "horizontal", "top", "bottom", "inner", "outer" and the like indicate orientation or positional relationships based on those shown in the drawings. Such terms are used only for the convenience of describing without indication or suggestion that the device or element referred to must have a specific orientation, or be constructed and operated in a specific orientation, and therefore not limiting the present invention. In the description of the present invention, unless otherwise specified and limited, it should be noted that the terms "installation", "communication", and "connection" should be understood in a broad sense, such as mechanical or electrical connection, or both. The elements can be in internal communication, directly connected or indirectly connected through an intermediate medium. For those of ordinary skill in the art, the specific meaning of the above terms can be understood according to specific circumstances.

The above are only preferred embodiments of the present invention and are not intended to be limiting. Any modification, equivalent replacement, improvement and the like made within the spirit and principle of the present invention should be within the claimed protection scope.

What is claimed is:

1. A biomass gas-carbon co-production reactor, comprising: multiple downward bed pyrolysis zones which are symmetrically arranged around an axis the biomass gas-carbon co-production reactor; and further comprising, from top to bottom: a gas-solid separation zone, an activation zone and a secondary pyrolysis reaction zone; wherein the activation zone communicates with the gas-solid separation zone and the secondary pyrolysis reaction zone; the downward bed pyrolysis zones penetrate through a top of the gas-solid separation zone, and a heat carrier inlet and a raw material inlet are symmetrically arranged on a left side and a right side of each of the downward bed pyrolysis zones; bottoms of the downward bed pyrolysis zones are located inside the secondary pyrolysis reaction zone; a fluidizing air inlet is provided at a bottom of the secondary pyrolysis reaction zone to keep the secondary pyrolysis reaction zone and the activation zone at a fluidizing state, and an activated gas inlet is provided at a top of the secondary pyrolysis reaction zone; an activated carbon outlet is provided on the gas-solid separation zone, and a cyclone separator is provided in the gas-solid separation zone; a top of the cyclone separator penetrates through the top of the gas-solid separation zone, and a bottom of the cyclone separator is located inside the secondary pyrolysis reaction zone.

2. The biomass gas-carbon co-production reactor, as recited in claim 1, wherein middle cross sections of the gas-solid separation zone, the activation zone and the secondary pyrolysis reaction zone are all circular, and a ratio of the middle cross sections is (1.4-3):1:(0.4-0.9).

3. The biomass gas-carbon co-production reactor, as recited in claim 1, wherein an air distribution plate is fixed in the secondary pyrolysis reaction zone, and divides the secondary pyrolysis reaction zone into an upper portion having a bubbling bed pyrolysis zone and a lower portion having an air chamber; the fluidizing air inlet communicates with the air chamber; the activated gas inlet communicates with a top of the bubbling bed pyrolysis zone; the bottoms of the downward bed pyrolysis zones are located above the air distribution plate.

4. The biomass gas-carbon co-production reactor, as recited in claim 1, wherein cross sections of the downward bed pyrolysis zones are rectangular, square, or circular.

5. The biomass gas-carbon co-production reactor, as recited in claim 1, wherein multiple guide plates are fixed inside the secondary pyrolysis reaction zone, which correspond to the downward bed pyrolysis zones; cross-sectional areas of bottoms of the guide plates are greater than cross-sectional areas of the downward bed pyrolysis zones; the guide plates are located right below the downward bed pyrolysis zones.

6. The biomass gas-carbon co-production reactor, as recited in claim 1, wherein the top of the cyclone separator is provided with a medium heat value gas outlet, and the medium heat value gas outlet penetrates through the top of the gas-solid separation zone.

7. The biomass gas-carbon co-production reactor, as recited in claim 1, wherein the activated carbon outlet is inclined; an angle between a top of the activated carbon outlet and a side all of a second shell is smaller than an angle between a bottom of the activated carbon outlet and the side wall of the second shell.

8. A reaction method of biomass gas-carbon co-production using a biomass gas-carbon co-production reactor as recited in claim 1, comprising steps of:
   step 1: adding a heat carrier and biomass raw material particles into a downward bed pyrolysis zone through a heat carrier inlet and a raw material inlet, respectively; wherein the heat carrier and the biomass raw material particles gradually fall;
   step 2: fully contacting the biomass raw material particles with the heat carrier during falling in the downward bed pyrolysis zone, in such a manner that a rapid pyrolysis reaction happens to generate high-temperature oil gas and a mixture of biomass pyrolysis semi-coke and the heat carrier;
   step 3: passing the high-temperature oil gas and the mixture of the biomass pyrolysis semi-coke and the heat carrier through a bottom of the downward bed pyrolysis zone, in such a manner that the high-temperature oil gas and the mixture fall into a bubbling bed pyrolysis zone of a secondary pyrolysis reaction zone; wherein the high-temperature oil gas in the bubbling bed pyrolysis zone generates fuel gas through secondary pyrolysis, and the mixture of the biomass pyrolysis semi-coke and the heat carrier are separated in the secondary pyrolysis reaction zone;

step 4: transporting activated gas into an air chamber through a fluidizing air inlet, and then transporting the activated gas into the bubbling bed pyrolysis zone to be mixed with the fuel gas generated in the step 3;

step 5: gradually moving a mixed gas of the fuel gas and the activated gas from the secondary pyrolysis reaction zone to an activation zone, and then from the activation zone to a gas-solid separation zone;

step 6: separating the mixed gas of the fuel gas and the activated gas in the gas-solid separation zone by a cyclone separator to produce fine powder particles and medium heat value gas, wherein the medium heart value gas is discharged through a medium heat value gas outlet, and the fine powder particles gradually fall into the secondary pyrolysis reaction zone;

step 7: remaining the heat carrier separated in the step 3 in the bubbling bed pyrolysis zone as a bubbling bed, and moving the biomass pyrolysis semi-coke from the secondary pyrolysis reaction zone to the activation zone;

step 8: moving the activated gas into the activation zone through an activated gas inlet, to contact with and activate the biomass pyrolysis semi-coke moved into the activation zone in the step 7, thereby generating activated carbon; and step 9: discharging the activated carbon generated in the step 8 from an activated carbon outlet.

9. The reaction method, as recited in claim 8, wherein in the step 4, the activated gas transported into the air chamber through the fluidizing air inlet is high-temperature water vapor; in the step 8, the activated gas moved into the activation zone through the activated gas inlet is water vapor and carbon dioxide.

10. The reaction method, as recited in claim 9, wherein a slag discharge port, which is circular, is provided at a center of a circle at a bottom of the secondary pyrolysis reaction zone.

\* \* \* \* \*